US012704855B2

(12) United States Patent
Mcgrady et al.

(10) Patent No.: US 12,704,855 B2
(45) Date of Patent: Aug. 11, 2026

(54) CONTROL SYSTEMS FOR AUTONOMOUS VEHICLE DEPLOYMENT AND VEHICLE COOLING PRIORITY

(71) Applicant: GM GLOBAL TECHNOLOGY OPERATIONS LLC, Detroit, MI (US)

(72) Inventors: Shawn Mcgrady, Holly, MI (US); Susan A. Dombrowski, Milford, MI (US); Aaron B. Bloom, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 18/830,146

(22) Filed: Sep. 10, 2024

(65) Prior Publication Data

US 2026/0072445 A1 Mar. 12, 2026

(51) Int. Cl.

| | |
|---|---|
| ***G05D 1/646*** | (2024.01) |
| ***B60L 58/13*** | (2019.01) |
| ***G05D 1/69*** | (2024.01) |
| ***G06Q 10/0639*** | (2023.01) |
| *G05D 105/20* | (2024.01) |
| *G05D 109/10* | (2024.01) |

(52) U.S. Cl.

CPC .............. *G05D 1/646* (2024.01); *B60L 58/13* (2019.02); *G05D 1/69* (2024.01); *G06Q 10/06393* (2013.01); *G05D 2105/20* (2024.01); *G05D 2109/10* (2024.01)

(58) Field of Classification Search

CPC ...... G05D 1/646; G05D 1/69; G05D 2109/10; G05D 2105/20; B60L 58/13; G06Q 10/06393

See application file for complete search history.

(56) References Cited

U.S. PATENT DOCUMENTS

| | | | | |
|---|---|---|---|---|
| 9,104,567 | B2 * | 8/2015 | Moser | G06F 11/0751 |
| 9,984,574 | B2 * | 5/2018 | Laetz | G06Q 10/047 |
| 10,331,141 | B2 * | 6/2019 | Grimm | G01C 21/3407 |
| 12,384,410 | B2 * | 8/2025 | Zhang | B60W 30/18159 |
| 2018/0259976 | A1 * | 9/2018 | Williams | G06Q 50/40 |
| 2019/0120640 | A1 * | 4/2019 | Ho | G01C 21/3453 |

* cited by examiner

*Primary Examiner* — Gertrude Arthur Jeanglaude

(57) ABSTRACT

An example method for automated deployment of autonomous vehicles includes identifying multiple autonomous vehicles available for deployment to execute a requested automated driving route, obtaining vehicle status parameters for each of the multiple autonomous vehicles, wherein the vehicle status parameters include at least a thermal cooling priority status of each vehicle, receiving a target vehicle route associated with an autonomous vehicle service request, determining route parameters associated with the target vehicle route, wherein the route parameters include at least a vehicle thermal load value associated with the target vehicle route, selecting one of the multiple autonomous vehicles according to the route parameters and the thermal cooling priority status of said autonomous vehicle, and deploying the selected one of the multiple autonomous vehicles to execute the target vehicle route using automated driving.

20 Claims, 6 Drawing Sheets

CONTROL SYSTEMS FOR AUTONOMOUS VEHICLE DEPLOYMENT AND VEHICLE COOLING PRIORITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to control systems for autonomous vehicle deployment, including deployment based on vehicle cooling priority status.

Autonomous vehicles may be used for automated route navigation requests, such as customer ride hailing requests and package delivery requests. Passengers are sensitive to interior cabin temperatures of the vehicles, and prefer riding in vehicles where the interior cabin temperature is not too high.

SUMMARY

An example method for automated deployment of autonomous vehicles includes identifying multiple autonomous vehicles available for deployment to execute a requested automated driving route, obtaining vehicle status parameters for each of the multiple autonomous vehicles, wherein the vehicle status parameters include at least a thermal cooling priority status of each vehicle, receiving a target vehicle route associated with an autonomous vehicle service request, determining route parameters associated with the target vehicle route, wherein the route parameters include at least a vehicle thermal load value associated with the target vehicle route, selecting one of the multiple autonomous vehicles according to the route parameters and the thermal cooling priority status of said autonomous vehicle, and deploying the selected one of the multiple autonomous vehicles to execute the target vehicle route using automated driving.

In some examples, the automated driving includes automated acceleration control of the selected one of the multiple autonomous vehicles, automated braking control of the selected one of the multiple autonomous vehicles, and automated steering control of the selected one of the multiple autonomous vehicles based on the target vehicle route.

In some examples, the autonomous vehicle service request includes at least one of an autonomous vehicle ride hail request or an autonomous vehicle package delivery request.

In some examples, the vehicle status parameters include at least one of a sensed passenger cabin temperature, a sensed passenger cabin humidity, and a state of charge of a vehicle battery module.

In some examples, the route parameters include at least one of an outside air temperature value, a solar load associated with the target vehicle route, an incline grade along the target vehicle route, a vehicle front end air flow (FEAF) value, and a degree of expected vehicle stops along the target vehicle route.

In some examples, the method includes obtaining key performance indicator values after completion of the target vehicle route by the selected one of the multiple autonomous vehicles, receiving feedback input from a rider in the selected one of the multiple autonomous vehicles after completion of the target vehicle route, and updating an autonomous vehicle deployment selection model based on the key performance indicator values and the feedback input.

In some examples, selecting one of the multiple autonomous vehicles includes obtaining a state of charge of a vehicle battery module of the selected one of the multiple autonomous vehicles, comparing the state of charge to a specified state of charge threshold value, and charging the vehicle battery module and delaying deployment of the selected one of the multiple autonomous vehicles in response to the state of charge being less than the specified state of charge threshold value.

In some examples, the specified state of charge threshold value is a twenty-five percent state of charge. In some examples, selecting one of the multiple autonomous vehicles includes identifying the thermal cooling priority status of the selected one of the multiple autonomous vehicles, selecting route criteria corresponding to the thermal cooling priority status, and deploying the selected one of the multiple autonomous vehicles to execute the target vehicle route in response to the route parameters associated with the target vehicle route satisfying the route criteria.

In some examples, selecting route criteria includes selecting a high front end air flow (FEAF) route criteria in response to the thermal cooling priority status having a medium or high value.

In some examples, selecting route criteria includes excluding deployment for ride hail route requests in response to the thermal cooling priority status having a high value.

In some examples, selecting route criteria includes deployment for all route requests in response to the thermal cooling priority status having a low value.

In some examples, the method includes delaying deployment of the selected one of the multiple autonomous vehicles in response to the route parameters associated with the target vehicle route failing to satisfying the route criteria, and assigning the selected one of multiple autonomous vehicles for further vehicle battery module cooling.

In some examples, selecting one of the multiple autonomous vehicles includes selecting an autonomous vehicle having a highest battery module state of charge among multiple vehicles having a same thermal cooling priority status.

An example system for automated deployment of autonomous vehicles includes memory configured to store computer-executable instructions, and at least one processor configured to execute the computer-executable instructions to identify multiple autonomous vehicles available for deployment to execute a requested automated driving route, obtain vehicle status parameters for each of the multiple autonomous vehicles, wherein the vehicle status parameters include at least a thermal cooling priority status of each vehicle, receive a target vehicle route associated with an autonomous vehicle service request, determine route parameters associated with the target vehicle route, wherein the route parameters include at least a vehicle thermal load value associated with the target vehicle route, select one of the multiple autonomous vehicles according to the route parameters and the thermal cooling priority status of said autonomous vehicle, and deploy the selected one of the multiple autonomous vehicles to execute the target vehicle route using automated driving.

In some examples, the automated driving includes automated acceleration control of the selected one of the multiple autonomous vehicles, automated braking control of the selected one of the multiple autonomous vehicles, and automated steering control of the selected one of the multiple autonomous vehicles based on the target vehicle route.

In some examples, the autonomous vehicle service request includes at least one of an autonomous vehicle ride hail request or an autonomous vehicle package delivery request.

In some examples, the vehicle status parameters include at least one of a sensed passenger cabin temperature, a sensed passenger cabin humidity, and a state of charge of a vehicle battery module.

In some examples, the route parameters include at least one of an outside air temperature value, a solar load associated with the target vehicle route, an incline grade along the target vehicle route, a vehicle front end air flow (FEAF) value, and a degree of expected vehicle stops along the target vehicle route.

In some examples, the at least one processor configured to execute the computer-executable instructions to obtain key performance indicator values after completion of the target vehicle route by the selected one of the multiple autonomous vehicles, receive feedback input from a rider in the selected one of the multiple autonomous vehicles after completion of the target vehicle route, and update an autonomous vehicle deployment selection model based on the key performance indicator values and the feedback input.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
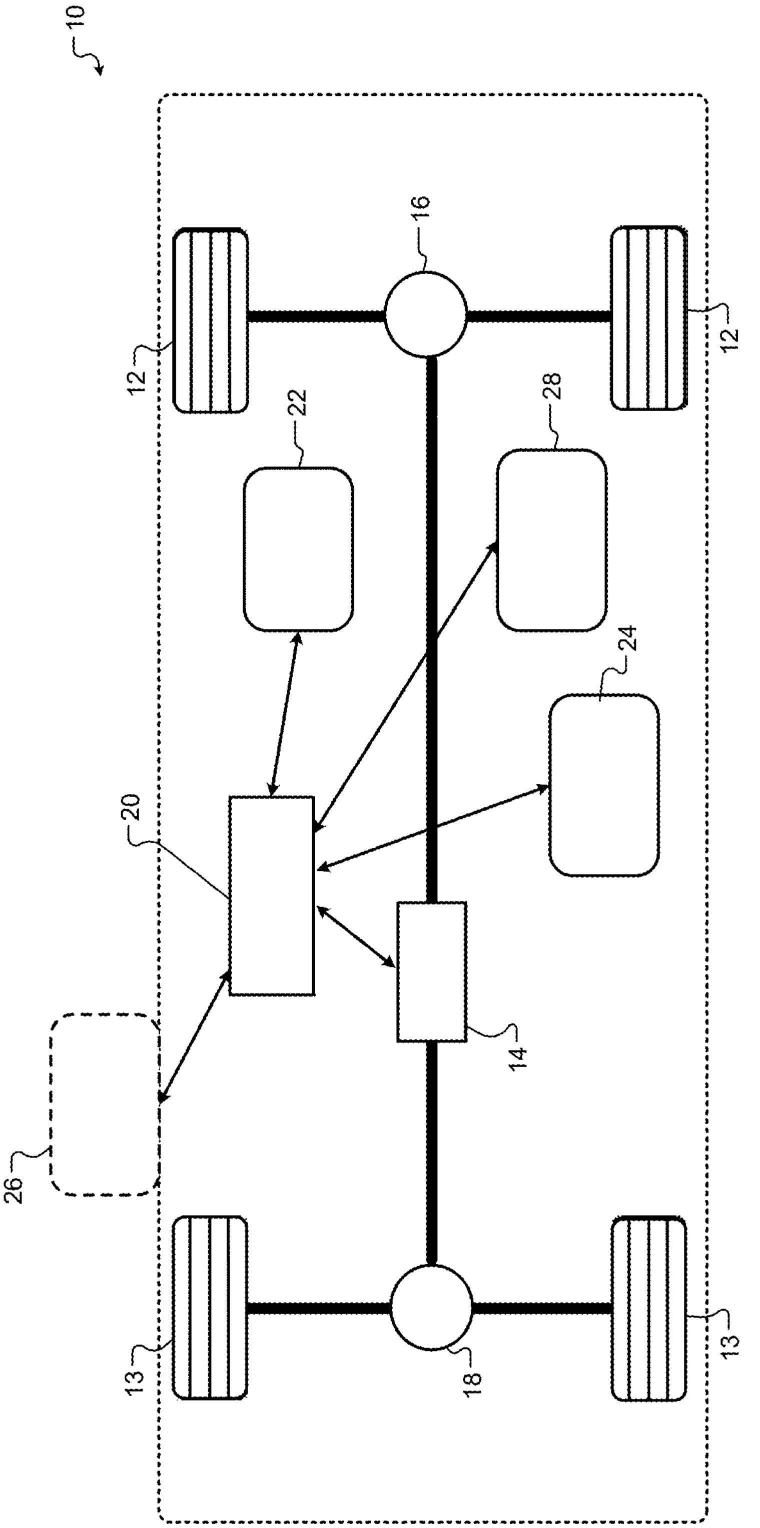
FIG. 1 is a functional block diagram of an example embodiment of a vehicle including a vehicle control module and multiple vehicle sensors.

In some example embodiments, autonomous vehicle deployment systems identify a group of vehicles and assess the thermal state of the vehicles, then cross-reference available vehicles with requested autonomous vehicle routes, such as automated ride hail routes and automated package delivery routes. Deployment of the autonomous vehicles may be prioritized based on assessment of the vehicle thermal statues, vehicle priority cooling states, environmental factors, and vehicle health (e.g., rechargeable energy storage system (RESS) temperatures), to increase customer satisfaction and reduce on-road energy consumption. Additionally, receiving rider feedback and monitoring vehicle states while navigating the routes may allow the system to learn what are the most efficient and best customer deployment factors in order continually tune the autonomous vehicle deployment criteria.

In some examples, a thermal measurement method is used to rank order autonomous vehicles (AVs) by thermal capacity as they relate to energy efficiency, add geographical weather information relevant to the vehicle, and a requested service route planner. The system may cross-reference each car with upcoming requested routes to identify which car is a best candidate for the requested route. Various vehicle and route inputs may then be taken into consideration to determine which vehicle should be deployed on which route.

In various implementations, a target vehicle path (e.g., requested autonomous navigation route) is cross-referenced against a current vehicle thermal state to identify if the vehicle is in a cool thermal state, a nominal thermal state or a hot thermal state. For example, if a high voltage (HV) cooling priority of the vehicle is greater than one, the system may choose a route that is low load (e.g., low thermal load or low battery energy load), with high front end air flow (FEAF) to increase condensing capacity of the vehicle and an overall amount of heat rejection in the vehicle. This approach may balance host vehicle and customer cooling demands.

If a vehicle is determined to have a nominal cooling status (e.g., priority 1 cooling), the vehicle may have more thermal capacity and can be deployed for more aggressive routes that may limit the amount of heat rejection capacity. For example, routes that have a high outside air temperature (OAT), a high solar load combined with low-speed city traffic, high propulsion cooling, etc.

If the forecasted path includes city traffic, and the vehicle thermal status is "hot" with high priority cooling of 3 or greater, for example, the system may increase a chiller request to cool a battery module (e.g., a RESS) in advance of a low front end airflow. The vehicle may be returned to a bucket of available vehicles if the vehicle is deemed too hot to deploy. For example, the system may utilize a departure time based RESS conditioning, by waiting for a compete charge of the vehicle battery, by sending a request to condition the RESS while on grid power, by turning off vehicle heating, air-conditioning and cooling (HVAC) until the RESS is at priority 1 cooling, etc.

In some examples, an autonomous vehicle deployment algorithm may determine RESS cooling, and cabin cooling capacity, based on vehicle inputs. For example, if more than one vehicle is available to satisfy a route planner in a required time, and the available vehicles have a thermally equivalent status, the autonomous vehicle deployment process may pick a lowest SOC car and reroute other vehicle(s) to a waypoint to charge.

If it is hot outside and more than one vehicle is available within driving range of a requested pickup location, the system may deploy the car with the lowest thermal status, (e.g., vehicle cooling priority 1), to pick up a customer for a ride hail service request. After the route is complete, the system may store pertinent post ride Key Performance Indicators (KPIs). The KPIs, along with rider feedback (e.g., received from ride hail passengers via an application), may then be used to evaluate the autonomous vehicle deployment model and make any adjustments necessary or desired.

Example embodiments described herein may provide various benefits and advantages, such as warranty reduction, faster response time, emissions reduction, cost avoidance, improved fuel economy, etc. Autonomous vehicle customer perception may depend on consistent performance and conditioning of the vehicle prior to entry, compared to automated ride hail programs with variability or poor service.

Vehicles may have an overall lower usage of energy according to some example embodiment, and therefore may need to charge less often. This may facilitate more AVs on the road at once, and with a higher density of AVs available for ride hailing, the wait time for an AV will be lower.

Example algorithms may reduce the thermal and electrical loads on the car's high voltage battery, which means over the life of the vehicle battery pack it will have a lower average throughput and last longer. This will reduce the frequency of HV RESS replacements during the lifespan of an AV.

The low voltage 12V grids in AVs consume approximately ⅓rd of the high voltage energy on cycle. This means that the fans, cabin blower, ECUs, ADSC, and AV sensor suite impact on-cycle range, efficiency, and thus ZEV credits. Lowering the overall electrical usage of the thermal system may have tangible improvement effects in some or all of the above.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell electric vehicle (FCEV), a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a battery voltage sensor 22, which may be configured to sense one or more voltage of battery module(s) of the vehicle 10 (e.g., to determine a state of charge of the vehicle battery module). A cabin temperature sensor 24 may be configured to sense a temperature in a passenger cabin of the vehicle 10, and a cabin humidity sensor 28 may be configured to sense a humidity value in the passenger cabin of the vehicle 10. The vehicle 10 includes an optional external temperature sensor 26 configured to sense an ambient temperature of an environment in which the vehicle is driving, although other systems may obtain external temperatures from a server, weather provider service, etc.

The vehicle 10 may be an autonomous vehicle configured for automated driving and route navigation (e.g., steering, acceleration and braking) without a human driver. For example, the vehicle 10 may include optional front vehicle cameras and an optional side vehicle cameras. Each vehicle camera may include any suitable camera, laser, lidar sensor, etc., which is used to capture images around the vehicle 10 (such as a front vehicle camera image depicting a scene in front of the vehicle, etc.). In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc.

Referring again to FIG. 1, the vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
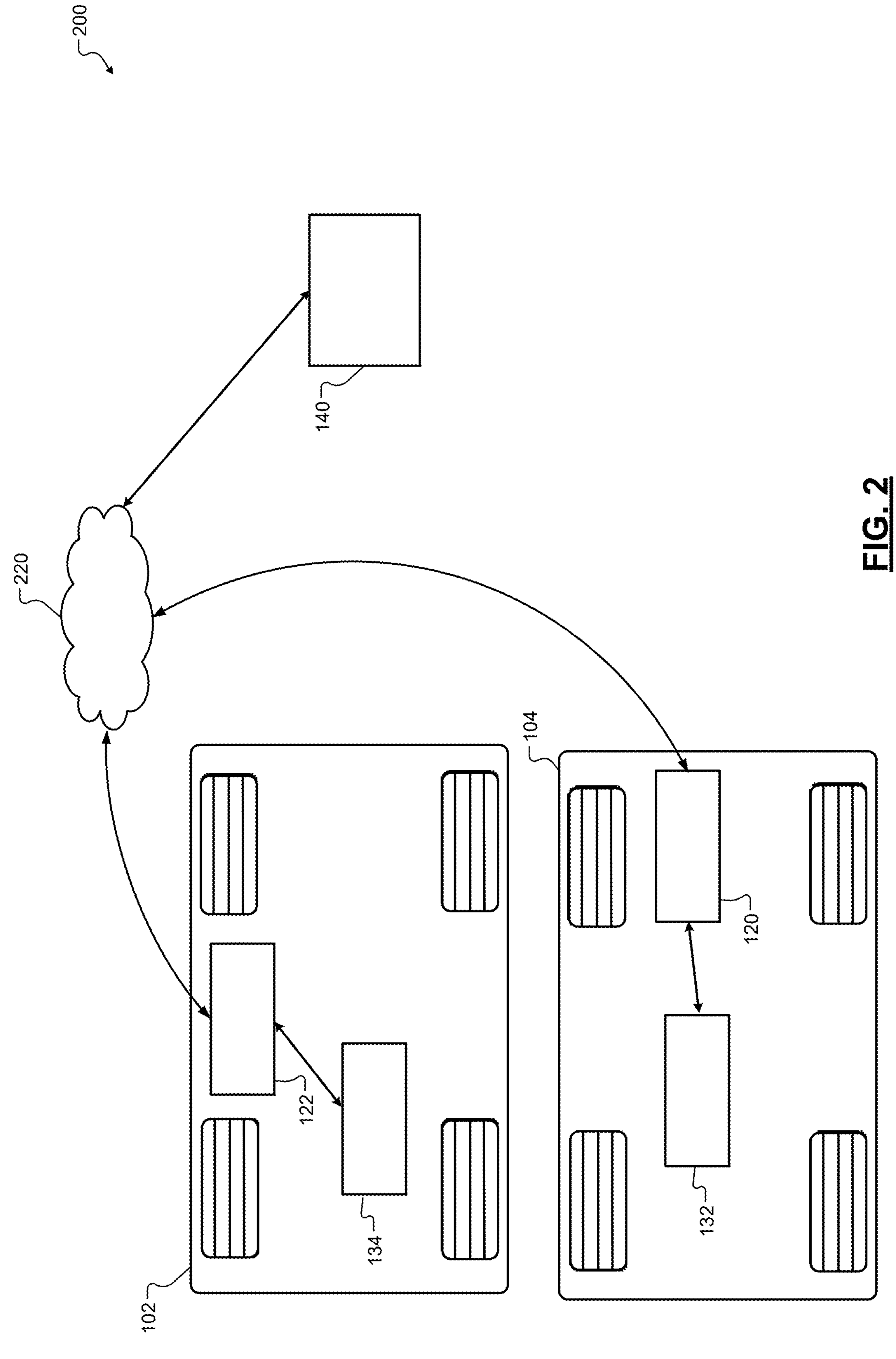
FIG. 2 is a block diagram of multiple autonomous vehicles in communication with an autonomous vehicle priority scheduling module.
Figure 3:
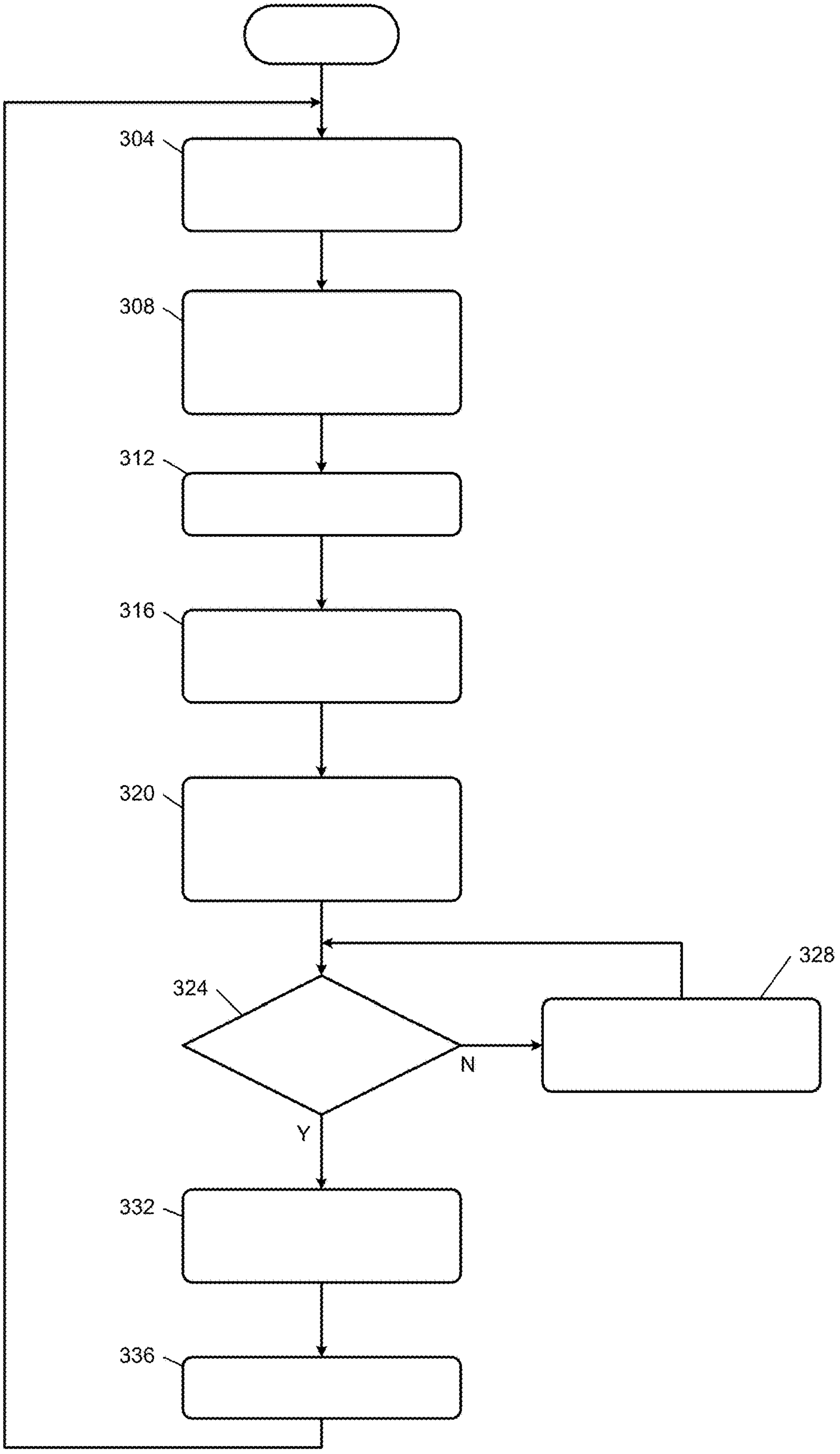
FIG. 3 is a flowchart depicting an example process for deploying autonomous vehicle based on vehicle cooling priority status.

FIG. 2 is a block diagram illustrating multiple autonomous vehicles 200 in communication with an autonomous vehicle priority scheduling module 140. As shown in FIG. 3, a first autonomous vehicle 102 includes vehicle sensors 134, and a second autonomous vehicle 104 includes vehicle sensors 132.

The vehicle control module 122 is configured to obtain operational parameters of the first autonomous vehicle 102 via the vehicle sensors 134 (such as internal cabin temperature and humidity, battery state of charge, cooling priority status, etc.), and provide the operational parameters to the autonomous vehicle priority scheduling module 140 via a cloud network 220. The vehicle control module 120 is configured to obtain operational parameters of the second autonomous vehicle 104 via the vehicle sensors 134, and provide the operational parameters to the autonomous vehicle priority scheduling module 140 via the cloud network 220.

The autonomous vehicle priority scheduling module 140 is configured to determine a platoon sequence for the vehicles, based on the obtained operational parameters of the vehicles. For example, the autonomous vehicle priority scheduling module 140 may be configured to assign a lowest cooling priority status to a requested autonomous vehicle service route (e.g., ride hailing or package delivery).

FIG. 3 is a flowchart depicting an example process for deploying autonomous vehicle based on vehicle cooling priority status. The process may be performed by, for example, one or more of the autonomous vehicle priority scheduling module 140 of FIG. 2 and the vehicle control module 20 of FIG. 1.

At 304, the process begins by identifying autonomous vehicles available for deployment. For example, a set of vehicles may be designated for automated ride hailing, automated package delivery, etc., based on requested autonomous vehicle services. At 308, the process obtains current statuses of the vehicles via one or more physical or virtual sensors or algorithms, such as by using sensors including temperature sensors, humidity sensors, etc. Further details regarding obtaining vehicle status parameters are described below with reference to FIG. 4.

At 312, the control module is configured to receive a target vehicle route. For example, the target vehicle route may be a service request of a ride hail route for a passenger from their current location to a destination, a package delivery route from a package location to a drop off point, etc.

The control module is configured to determine vehicle route conditions and associated delivery parameters at 316. For example, control module may determine whether the route will have a large amount of stop and start events, whether the route will be mostly high speed highway driving, whether the route will traverse steep grades or be relatively flat, whether the route is expected to generate high front end air flow (FEAF) for the vehicle, or whether the vehicle will experience a high solar load while driving the route, etc.

At 320, control is configured to select a vehicle based on a cooling priority status and route parameters. For example, control may determine a cooling priority status for each vehicle based on vehicle parameters, vehicle settings or calculations, etc. The vehicle cooling priority status may be indicative of a cooling demand for a vehicle battery module or other components of the system, and may indicate how much vehicle cooling is available for other cooling needs such as cooling the passenger cabin with air conditioning. Further details regarding selection of vehicles based on cooling priority status and route parameters are described further below with reference to FIG. 5.

At 324, control determines whether the selected vehicle meets criteria for cooling priority status, temperature and route parameters. For example, control may determine whether the vehicle has a sufficiently low cooling priority and enough cooling demand is available for cooling the passenger cabin. Control may determine whether a ride hail service has been requested, where passenger cabin cooling is more important, or whether service has been requested for package delivery where interior temperature comfort is less important. Control may also determine whether the planned route will have higher thermal loads, such as many vehicle start and stop events, steep grades, or high solar loads, or whether the planned route will have lower temperature loads such as flat highway driving with high front end vehicle air flow.

If control determines at 324 that the vehicle does not meet temperature and route criteria, control proceeds to 328 to select a next vehicle based on cooling priority status and route parameters. Control then returns the 324 to determine where the next selected vehicle meets the temperature and route criteria.

If control determines at 324 that the selected vehicle does meet temperature and route criteria, control proceeds to 332 to deploy the selected vehicle for automated route navigation. For example, the vehicle may be sent to service a request for ride hailing, package delivery, etc., using autonomous vehicle control. Control then receives vehicle feedback input at 336, such as key performance indicators indicative of vehicle parameters during the drive, feedback from riders via an application, etc. Further details regarding receiving vehicle feedback input are described further below with respect to FIG. 6.

Figure 4:
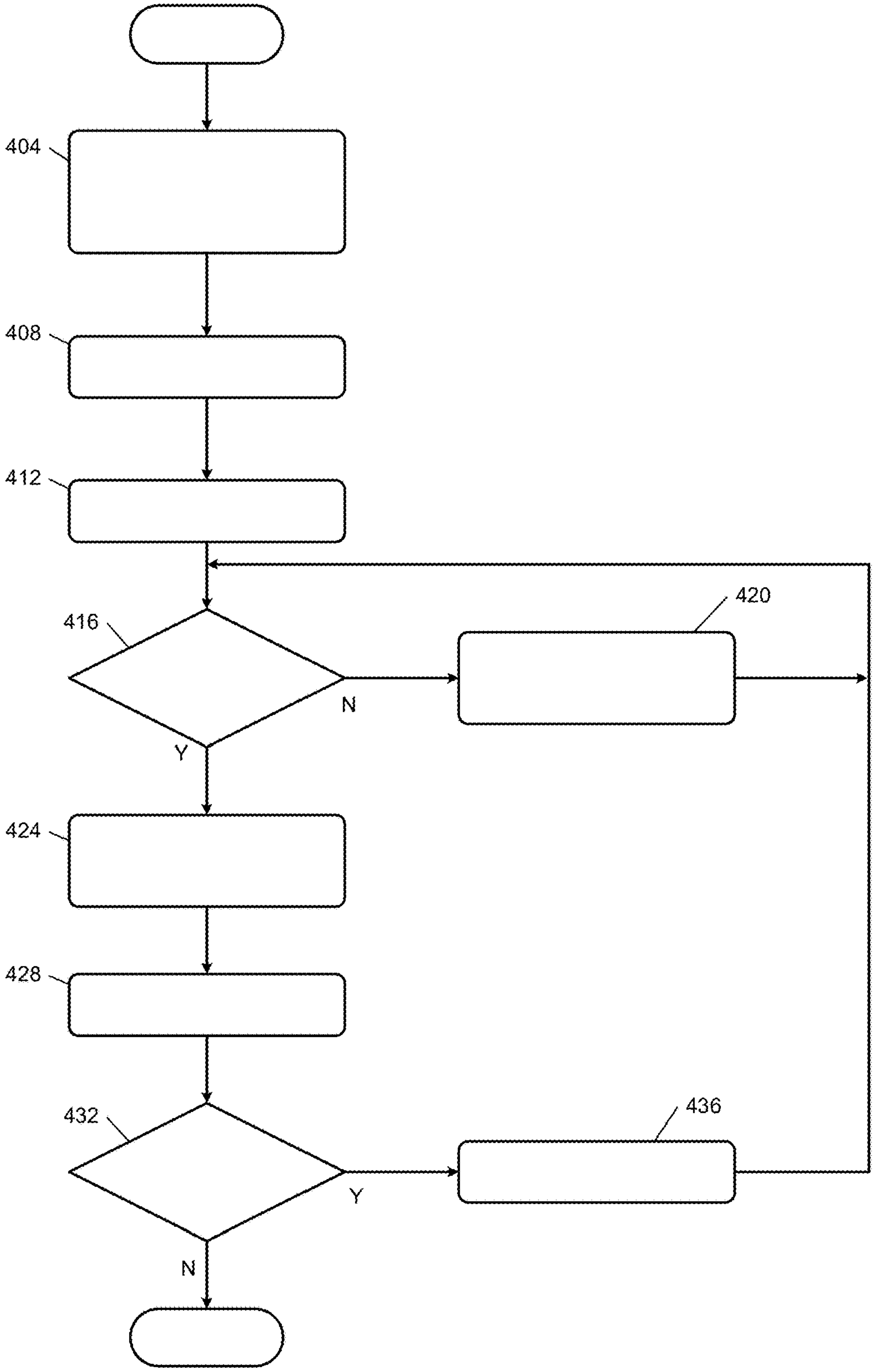
FIG. 4 is a flowchart depicting an example process for determining vehicle state of charge and cooling priority status parameters.

FIG. 4 is a flowchart depicting an example process for determining vehicle state of charge and cooling priority status parameters. The process may be performed by, for example, one or more of the autonomous vehicle priority scheduling module 140 of FIG. 2 and the vehicle control module 20 of FIG. 1. In some examples, some or all of the process of FIG. 4 may represent features of step 308 of FIG. 3.

At 404, the process begins by identifying all autonomous vehicles available for ride hail and package delivery requests. At 408, the process obtains environmental parameters, such as the outside air temperature and solar load values associated with routes in the vehicle area. Control then selects the first vehicle from the available list at 412.

At 416, the control module is configured to determine whether a vehicle state of charge (SOC) is greater than a threshold. For example, control may determine whether the vehicle has enough charge to complete the requested service (e.g., is the SOC sufficient for the target route), with optional backup capacity as needed. Example threshold values may include, but are not limited to, at least a 25% state of charge, at least a 50% state of charge, etc.

If the vehicle state of charge is not greater than the threshold at 416, control proceeds the 420 to charge the vehicle battery and remove the vehicle from the current available vehicle list. The vehicle may then be reconsidered for deployment when the state of charge of the vehicle battery rises above the threshold.

If the vehicle state of charge is greater than the threshold at 416, control proceeds to 424 to obtain passenger compartment temperature and humidity, such as via sensors of the vehicle. Control then proceeds to 428 to determine the vehicle cooling priority status. This may occur based on a vehicle thermal status, using one or more suitable sensors and algorithms.

At 432, control determines whether additional vehicles are remaining on the list. If so, control selects a next vehicle from the list at 426, then returns to 416 to determine whether the next selected vehicle has a state of charge above the threshold.

Figure 5:
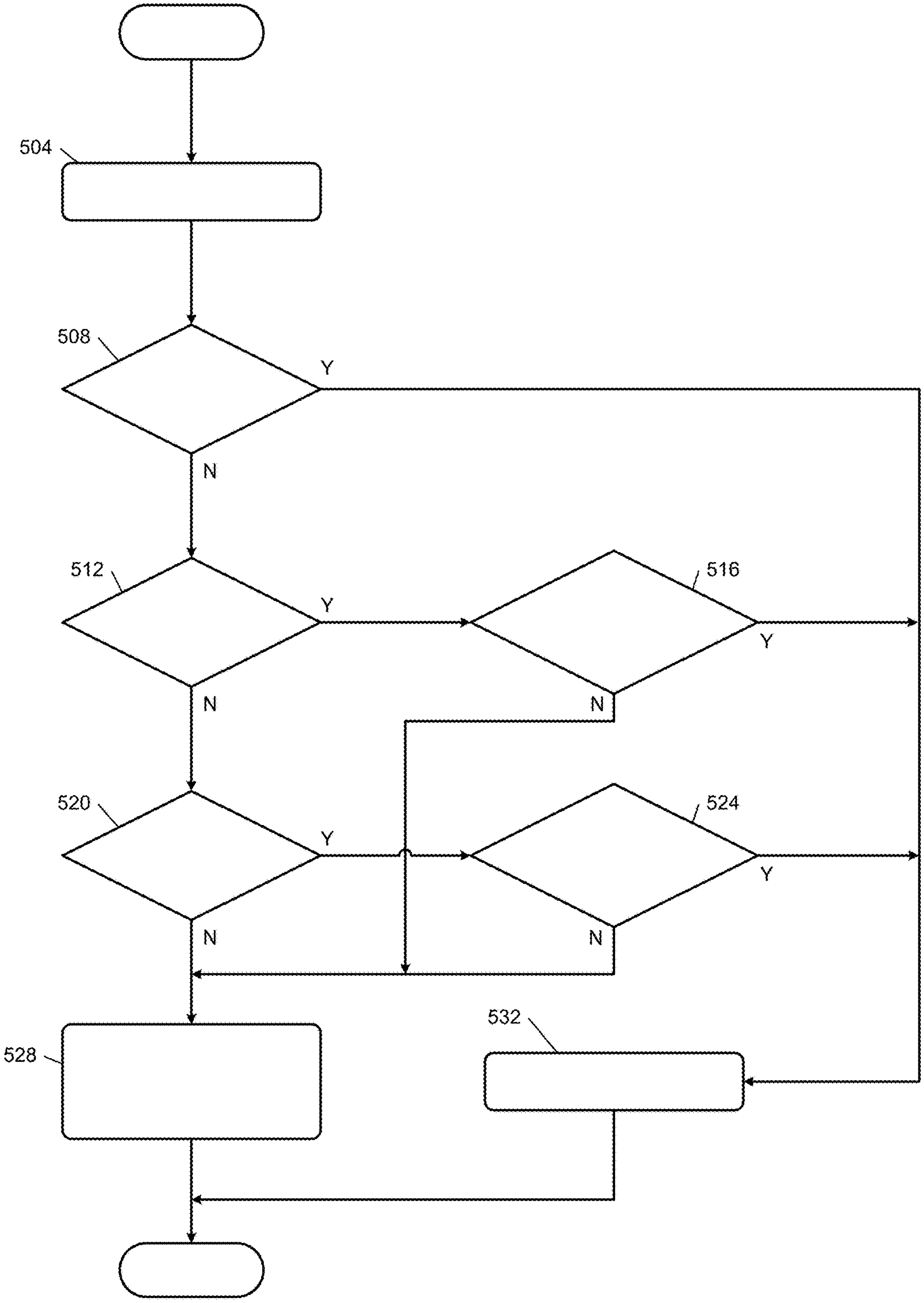
FIG. 5 is flowchart depicting an example process for determining whether to deploy an autonomous vehicle based on vehicle cooling priority status and route parameters.

FIG. 5 is flowchart depicting an example process for determining whether to deploy an autonomous vehicle based on vehicle cooling priority status and route parameters. The process may be performed by, for example, one or more of the autonomous vehicle priority scheduling module 140 of FIG. 2 and the vehicle control module 20 of FIG. 1. In some examples, some or all of the process of FIG. 5 may represent features of step 320 of FIG. 3.

At 504, the process begins by obtaining vehicle cooling priority status, which may be a calculation from the vehicle control module, may be based on a determination from vehicle sensors, etc. At 508, control determines whether the cooling priority status of the vehicle is equal to 1, such as a lowest cooling priority indicative that there is a low cooling demand currently on the vehicle (e.g., the vehicle battery and other components of the vehicle are already at cool temperatures and do not require significant further cooling at the current time).

If the cooling priority is equal to one at 508, control proceeds to 532 to deploy the vehicle for the requested service (e.g., because the vehicle is sufficiently cooled already to handle any requested service route). If the cooling priority is two or three at 512, such as a moderate or intermediate cooling priority value, control proceeds to 516 to determine additional parameters of the requested service route. Although FIG. 5 as grouping cooling priority values of two and three in a same bucket, other example embodiments may use more or less cooling priority values (such as up to ten or more cooling priority values), and different cooling priority values may be in individual or grouped buckets as desired.

For example, control may determine whether they requested service is package delivery, or ride hailing. If the requested service is package delivery, control may proceed to 532 to deploy the vehicle for the requested service. If the requested service is ride hailing, control may further determine route temperature parameters. For example, control may deploy the vehicle for the requested service if there is a medium or low outside air temperature, there is an expected high front end air flow for the vehicle along the route, and there is an expected low heat load on the vehicle during the route.

If control determines at 516 that the ride hail service has been requested, and there will be a high temperature load on the vehicle during the route, control may proceed to 528 to designate the vehicle for cooling of the battery module system prior to deployment, and then proceed to select a different vehicle for the ride hailing requested route.

If the cooling priority is equal to 4 at 520, which may indicate a highest cooling priority where the vehicle battery module and other vehicle components are at high temperatures and demand high cooling capacity of the vehicle, control proceeds to 524 to determine the type of service requested in other route parameters. For example, if ride haling is requested, the process may proceed to 528 to instead cool the battery module system and select a different vehicle.

If control determines at 524 that a package delivery service has been requested, control may determine whether the outside of your temperature is low or medium to allow deployment of vehicle for requested service at 532. If package delivery is requested at 524, but the outside air temperature is high, control may proceed to 528 to instead cool the battery module system and select a different vehicle.

Figure 6:
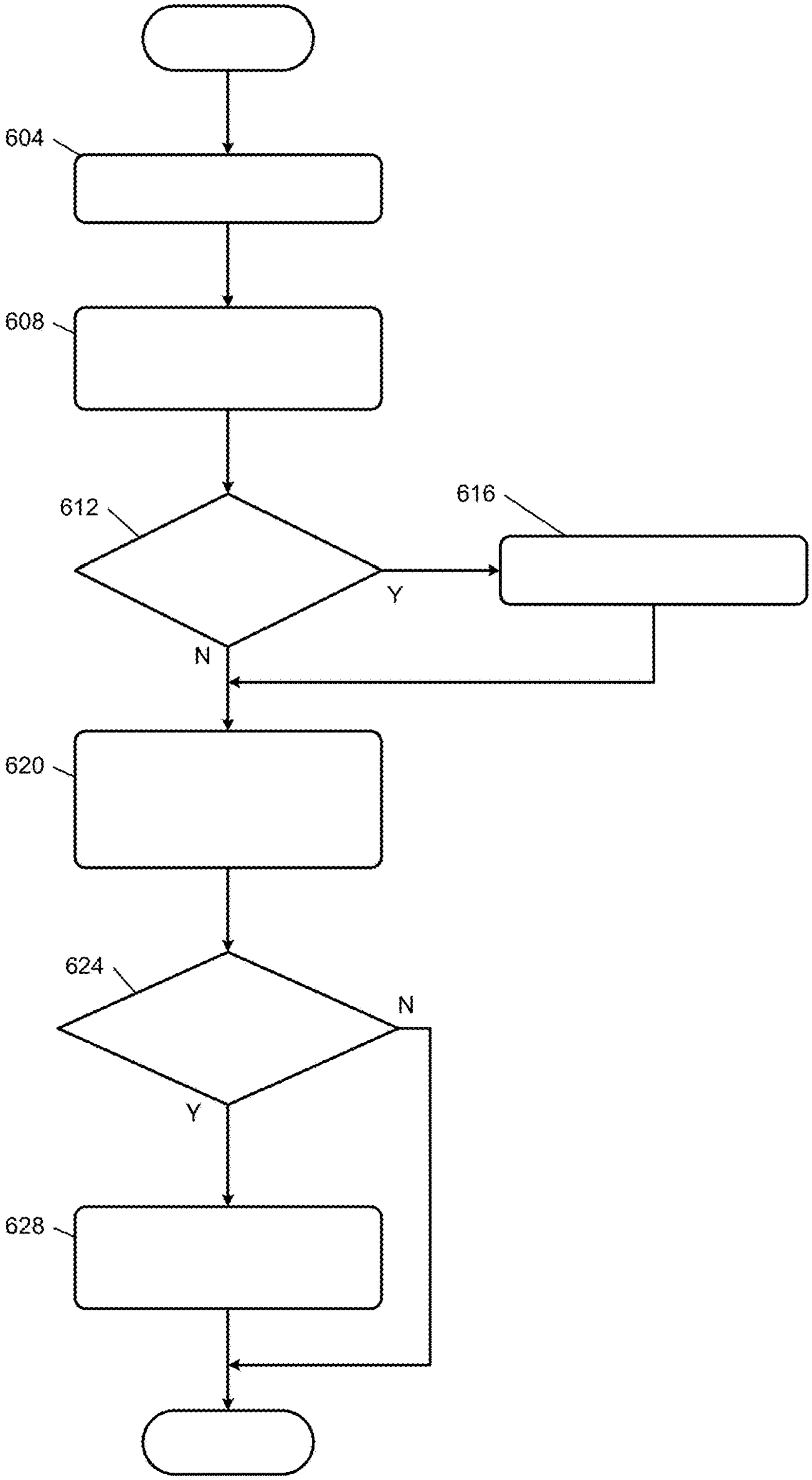
FIG. 6 is flowchart depicting an example process for updating an autonomous vehicle deployment model based on vehicle key performance indicators and ride feedback.

FIG. 6 is flowchart depicting an example process for updating an autonomous vehicle deployment model based on vehicle key performance indicators and ride feedback. The process may be performed by, for example, one or more of the autonomous vehicle priority scheduling module 140 of FIG. 2 and the vehicle control module 20 of FIG. 1. In some examples, some or all of the process of FIG. 6 may represent features of step 336 of FIG. 3.

At 604, the process begins by deploying the vehicle for the requested service, such as a ride hailing request or a package delivery request. At 608, control stores route navigation key performance indicators, which indicate how the vehicle performed in terms of temperature and other parameters during navigation of the requested route. At 612, control determines whether the requested service was a ride hail. If so, control proceeds to 616 to receive rider feedback via an application, such as the ride hail passenger indicating their level of temperature comfort during the ride.

At 620, control evaluates the autonomous vehicle deployment model based on the KPIs and the ride feedback. For example, control may determine whether the feedback was positive, or whether the feedback indicated that the vehicle cabin temperature rose too high during the route and the vehicle should not have been deployed.

At 624, control determines whether the automated vehicle deployment model needs an update, based on the rider feedback and/or key performance indicators. For example, an autonomous vehicle deployment model may be updated as needed based on feedback. If an update is needed, control proceeds to 628 to update the automated vehicle deployment model according to the KPIs and the rider feedback, such as by reducing the amounts of routes permitted if the vehicle is already at a high cooling priority status and the passenger comfort was not sufficient during the ride.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” or the term “controller” may be replaced with the term “circuit.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for automated deployment of autonomous vehicles, the method comprising:

identifying, by at least one processor, multiple autonomous vehicles available for deployment to execute a requested automated driving route;

obtaining, by the at least one processor, vehicle status parameters for each of the multiple autonomous vehicles, wherein the vehicle status parameters include at least a thermal cooling priority status of each vehicle;

receiving, by the at least one processor, a target vehicle route associated with an autonomous vehicle service request;

determining, by the at least one processor, route parameters associated with the target vehicle route, wherein the route parameters include at least a vehicle thermal load value associated with the target vehicle route;

selecting, by the at least one processor, one of the multiple autonomous vehicles according to the route parameters and the thermal cooling priority status of said autonomous vehicle, by obtaining a state of charge of a vehicle battery module of the selected one of the multiple autonomous vehicles, comparing the state of charge to a specified state of charge threshold value, and charging the vehicle battery module and delaying deployment of the selected one of the multiple autonomous vehicles in response to the state of charge being less than the specified state of charge threshold value; and deploying, by the at least one processor, the selected one of the multiple autonomous vehicles to execute the target vehicle route using automated driving.

2. The method of claim 1, wherein the automated driving includes automated acceleration control of the selected one of the multiple autonomous vehicles, automated braking control of the selected one of the multiple autonomous vehicles, and automated steering control of the selected one of the multiple autonomous vehicles based on the target vehicle route.

3. The method of claim 1, wherein the autonomous vehicle service request includes at least one of an autonomous vehicle ride hail request or an autonomous vehicle package delivery request.

4. The method of claim 1, wherein the vehicle status parameters include at least one of a sensed passenger cabin temperature, a sensed passenger cabin humidity, and a state of charge of a vehicle battery module.

5. The method of claim 1, wherein the route parameters include at least one of an outside air temperature value, a solar load associated with the target vehicle route, an incline grade along the target vehicle route, a vehicle front end air flow (FEAF) value, and a degree of expected vehicle stops along the target vehicle route.

6. The method of claim 1, wherein the specified state of charge threshold value is a twenty-five percent state of charge.

7. The method of claim 1, wherein selecting one of the multiple autonomous vehicles includes:

identifying the thermal cooling priority status of the selected one of the multiple autonomous vehicles;

selecting route criteria corresponding to the thermal cooling priority status; and deploying the selected one of the multiple autonomous vehicles to execute the target vehicle route in response to the route parameters associated with the target vehicle route satisfying the route criteria.

8. The method of claim 7, wherein selecting route criteria includes selecting a high front end air flow (FEAF) route criteria in response to the thermal cooling priority status having a medium or high value.

9. The method of claim 7, wherein selecting route criteria includes excluding deployment for ride hail route requests in response to the thermal cooling priority status having a high value.

10. The method of claim 7, wherein selecting route criteria includes deployment for all route requests in response to the thermal cooling priority status having a low value.

11. The method of claim 7, further comprising delaying deployment of the selected one of the multiple autonomous vehicles in response to the route parameters associated with the target vehicle route failing to satisfying the route criteria, and assigning the selected one of multiple autonomous vehicles for further vehicle battery module cooling.

12. The method of claim 1, wherein selecting one of the multiple autonomous vehicles includes selecting an autonomous vehicle having a highest battery module state of charge among multiple vehicles having a same thermal cooling priority status.

13. A method of for automated deployment autonomous vehicles, the method comprising:

identifying, by at least one processor, multiple autonomous vehicles available for deployment to execute a requested automated driving route;

obtaining, by the at least one processor, vehicle status parameters for each of the multiple autonomous vehicles, wherein the vehicle status parameters include at least a thermal cooling priority status of each vehicle;

receiving, by the at least one processor, a target vehicle route associated with an autonomous vehicle service request;

determining, by the at least one processor, route parameters associated with the target vehicle route, wherein the route parameters include at least a vehicle thermal load value associated with the target vehicle route;

selecting, by the at least one processor, one of the multiple autonomous vehicles according to the route parameters and the thermal cooling priority status of said autonomous vehicle;

deploying, by the at least one processor, the selected one of the multiple autonomous vehicles to execute the target vehicle route using automated driving;

obtaining, by the at least one processor, key performance indicator values after completion of the target vehicle route by the selected one of the multiple autonomous vehicles;

receiving, by the at least one processor, feedback input from a rider in the selected one of the multiple autonomous vehicles after completion of the target vehicle route; and updating, by the at least one processor, an autonomous vehicle deployment selection model based on the key performance indicator values and the feedback input.

14. The method of claim 13, wherein selecting one of the multiple autonomous vehicles includes selecting an autonomous vehicle having a highest battery module state of charge among multiple vehicles having a same thermal cooling priority status.

15. A system for automated deployment of autonomous vehicles, the system including:

memory configured to store computer-executable instructions; and at least one processor configured to execute the computer-executable instructions to:

identify multiple autonomous vehicles available for deployment to execute a requested automated driving route;

obtain vehicle status parameters for each of the multiple autonomous vehicles, wherein the vehicle status parameters include at least a thermal cooling priority status of each vehicle;

receive a target vehicle route associated with an autonomous vehicle service request;

determine route parameters associated with the target vehicle route, wherein the route parameters include at least a vehicle thermal load value associated with the target vehicle route;

select one of the multiple autonomous vehicles according to the route parameters and the thermal cooling priority status of said autonomous vehicle;

deploy the selected one of the multiple autonomous vehicles to execute the target vehicle route using automated driving;

obtain key performance indicator values after completion of the target vehicle route by the selected one of the multiple autonomous vehicles;

receive feedback input from a rider in the selected one of the multiple autonomous vehicles after completion of the target vehicle route; and update an autonomous vehicle deployment selection model based on the key performance indicator values and the feedback input.

16. The system of claim 15, wherein the automated driving includes automated acceleration control of the selected one of the multiple autonomous vehicles, automated braking control of the selected one of the multiple autonomous vehicles, and automated steering control of the selected one of the multiple autonomous vehicles based on the target vehicle route.

17. The system of claim 15, wherein the autonomous vehicle service request includes at least one of an autonomous vehicle ride hail request or an autonomous vehicle package delivery request.

18. The system of claim 15, wherein the vehicle status parameters include at least one of a sensed passenger cabin temperature, a sensed passenger cabin humidity, and a state of charge of a vehicle battery module.

19. The system of claim 15, wherein the route parameters include at least one of an outside air temperature value, a solar load associated with the target vehicle route, an incline grade along the target vehicle route, a vehicle front end air flow (FEAF) value, and a degree of expected vehicle stops along the target vehicle route.

20. The system of claim 15, wherein selecting one of the multiple autonomous vehicles includes selecting an autonomous vehicle having a highest battery module state of charge among multiple vehicles having a same thermal cooling priority status.

* * * * *